United States Patent
Ando et al.

(10) Patent No.: US 9,417,458 B2
(45) Date of Patent: Aug. 16, 2016

(54) IMAGE STABILIZING DEVICE AND SYSTEM FOR TELESCOPIC OPTICAL INSTRUMENTS

(71) Applicant: KAMAKURA KOKI CO., LTD., Saitama (JP)

(72) Inventors: Kunio Ando, Saitama (JP); Masashi Kato, Saitama (JP); Haruo Itoh, Kanagawa (JP); Kazuya Miyaji, Saitama (JP)

(73) Assignee: KAMAKURA KOKI CO., LTD., Saitama (JP)

( * ) Notice: Subject to any disclaimer, the term of this patent is extended or adjusted under 35 U.S.C. 154(b) by 0 days.

(21) Appl. No.: 14/606,969

(22) Filed: Jan. 27, 2015

(65) Prior Publication Data

US 2015/0219920 A1    Aug. 6, 2015

(30) Foreign Application Priority Data

Jan. 31, 2014   (JP) ................. 2014-016250

(51) Int. Cl.
| | | |
|---|---|---|
| G02B 27/64 | (2006.01) | |
| G02B 23/18 | (2006.01) | |
| G02B 5/04 | (2006.01) | |
| H02K 41/035 | (2006.01) | |

(52) U.S. Cl.
CPC .............. *G02B 27/646* (2013.01); *G02B 5/04* (2013.01); *G02B 23/18* (2013.01); *H02K 41/0354* (2013.01)

(58) Field of Classification Search
CPC .............. G02B 23/00–23/02; G02B 27/64; G02B 27/646; G02B 27/648
See application file for complete search history.

(56) References Cited

U.S. PATENT DOCUMENTS

| | | | |
|---|---|---|---|
| 4,235,506 A | 11/1980 | Saito et al. | |
| 5,798,863 A | 8/1998 | Udagawa et al. | |
| 5,978,137 A * | 11/1999 | Takahashi | G02B 23/18 348/E5.046 |
| 2005/0248661 A1* | 11/2005 | Stanvely | G03B 17/00 348/208.99 |
| 2009/0225177 A1* | 9/2009 | Maeda | G02B 27/646 348/208.99 |
| 2013/0176620 A1 | 7/2013 | Sato | |
| 2013/0194666 A1 | 8/2013 | Teroerde et al. | |
| 2013/0293956 A1* | 11/2013 | Dobermann | G02B 27/64 359/480 |
| 2015/0219920 A1* | 8/2015 | Ando | H02K 41/0354 359/557 |

FOREIGN PATENT DOCUMENTS

| | | |
|---|---|---|
| JP | 06-250100 A | 9/1994 |
| JP | 07-043645 A | 2/1995 |
| JP | H0815647 A | 1/1996 |
| JP | 10-020213 A | 1/1998 |
| JP | 2009288612 A | 12/2009 |

OTHER PUBLICATIONS

European Search Report (appln. No. 15000247.5), dated Jun. 17, 2015, 8 pages.

* cited by examiner

*Primary Examiner* — Thomas K Pham
*Assistant Examiner* — Cara Rakowski
(74) *Attorney, Agent, or Firm* — The Maxham Firm (57) ABSTRACT

An image stabilizing device and system for a binocular telescope having a pair of telescopic optical systems each comprising an objective lens, a gimbal mounted erecting prism and an eyepiece lens which is capable of compensating for deterioration in quality of an observed image due to user hand shake or other external vibrations.

19 Claims, 8 Drawing Sheets

IMAGE STABILIZING DEVICE AND SYSTEM FOR TELESCOPIC OPTICAL INSTRUMENTS

CROSS REFERENCE TO RELATED APPLICATIONS

The present invention is related to, and claims priority from, Japanese Patent Application Serial No. 2014-016250, filed 31 Jan. 2014, the disclosure of which is herein specifically incorporated by reference in its entirety.

FIELD OF THE INVENTION

The present invention relates to an image stabilizing device and system for telescopic optical instruments, such as binocular telescopes, which functions to compensate for deterioration in optical image quality induced by fluctuations in the angle of a light beam emanating from an object under observation relative to the optical axis of the optical system due to vibrations of the instrument, such as those which may be induced by user hand shake.

DISCUSSION OF RELATED ART

When a user holds a telescopic optical instrument, such as a binocular telescope, and operates it in order to make observations of an object (and in particular when operating a handheld binocular telescope in a flying aircraft, a moving vehicle, or a sailing ship or boat) the instrument may encounter user hand shake arising from vibrations imparted to the device housing. Such vibrations can also be due to the oscillating angular displacement or motion of the longitudinal axis of the aircraft, vehicle or ship due to yaw and pitch motions which may also be imparted to the instrument housing.

This user induced hand shake or other displacement can cause the binocular telescope to develop fluctuations in the angle of a beam of light emanating from the object under observation relative to the optical axis of the optical system of the instrument (which is hereinafter referred to as a "telescopic optical system"). This then results in a deterioration in the object image quality which may include at least blurring of the telescopic optical image, or image-shake (that is, the shaking of an image responding to hand shake due to vibrations of a hand-held telescopic optical instrument) as well as deterioration in the resolution of the telescopic optical image, among other problems. Even if vibrations imparted or applied to the binocular telescope are relatively small in amplitude, measurable deteriorations can be induced in the quality of the optical image due to the fact that the binocular telescope provides only a narrow field of view and the image formed by the objective lens is magnified through the instrument, eyepiece lens.

At present, there have been proposed various optical image stabilizers to compensate for deterioration in the quality of an optical image of an object under observation due to user hand shake. An example of optical image stabilizers employed in conventional telescopic optical instruments having an image-shake compensation function is described in the publication of examined Japanese patent application No. 57(1982)-37852 (which corresponds to U.S. Pat. No. 4,235,506 now expired and is hereinafter referred to as Document I). This optical, image stabiliser, which is of the form incorporated in binocular telescopes having a pair of right, and left telescopic optical systems, is comprised of a pair of right and left erecting prisms each of which is disposed between an objective lens and an eyepiece lens of each telescopic optical system of the binocular telescope, a single prism holder frame for fixedly holding the right and left erecting prisms, a gimbal device disposed coaxially between the pair of objective lenses and the pair of eyepiece lenses for suspending the prism holder frame for rotation about two axes orthogonally intersecting with each other in a plane perpendicular to optical axes of the telescopic optical systems, and a single gyro motor fixedly attached to the gimbal device.

The optical image stabilizer of Document 1 is structurally simple in that the driving mechanism for the gimbal device is a single gyro motor which drives the gimbal device suspending the single prism holder frame with the pair of right and left erecting prisms being fixedly held thereby.

Incidentally, when dealing with lateral or horizontal vibrations of the binocular telescope (oscillating angular displacements or motions of the longitudinal axis of the binocular telescope due to yawing), the conventional optical image stabilizer installed in the binocular telescope disclosed in Document I causes rotation of the prism holder frame about one of two orthogonally intersecting axes of rotation, namely the vertical axis of ration, centrally located at a point of intersection between the right and the left telescopic optical system, in this instance, the erecting prism of, for example, the left telescopic optical system is displaced in axial position, toward the object side lens and the erecting prism of the right telescopic optical system is displaced in axial position toward the image side, so that the distance between the erecting prism and the objective lens becomes different between, the right and the left, telescopic optical system. As a result, the telescopic optical image then presents a different visual appearance between the right and the left telescopic optical systems. In other words, implementing the optical image stabilizer of Document I results in the respective telescopic optical systems being rendered uncomfortable in that the physical relationship among their optical components (when the optical image stabilizer reacts to deal with horizontal vibrations or motions), and the telescopic optical images respectively viewed through the telescopic optical systems are rendered visually different from one another.

Another image stabilizing optical device for a telescope, which is disclosed in the publication of unexamined Japanese patent application No. 6(1994)-250100 (which is hereinafter referred to as Document II) is structurally similar to that of Document I. In much the same way as described above, this optical image stabilizer comprises a pair of right and left erecting prisms each of which is disposed between an objective lens and an eyepiece lens of each telescopic optical system of the binocular telescope, a single prism holder frame for fixedly holding the right and left erecting prisms, a gimbal device disposed coaxially between the pair of objective lenses and the pair of eyepiece lenses for suspending the prism holder frame for rotation about two axes orthogonally intersecting with each other in a plane perpendicular to optical axes of the telescopic optical systems, and a single gyro motor fixedly attached to the gimbal device.

In this optical, image stabilizer, the gimbal device with the pair of right and left erecting prisms retained by the prism holder frame is servo controlled to rotate and return to a specified state or an initial state so as thereby to compensate for deterioration of a telescopic optical image, due to image-shaking responding to vibrations imparted to the binocular telescope. These vibrations are detected in the form of information on rotational angles of the gimbal device relative due to the vibrations by angular velocity detection means mounted on the prism holder frame. As the optical image stabilizer described in Document II is provided, in place of a gyro motor for a gimbal actuator, with a drive mechanism which is comprised of a rotary motor far rotating pivot shafts of the gimbal device and position detection means such as a potentiometer for detecting an angle of rotation of the gimbal device, the optical image stabilizer is ensured to be miniaturized, reduced in weight and require little electrical power for its operation.

At the same time, the optical image stabilizer described in Document II also has the result that, as the respective telescopic optical systems are rendered uncomfortable in physical relationship among their multiple optical components when the image-stabilizing optical device reacts to deal with horizontal vibrations or motions, the telescopic optical images respectively viewed through the telescopic optical systems bear no relationship to the visual appearance between the images formed by the respective telescopic optical systems in a manner similar to the optical image stabilizer described previously with respect to Document I.

A telescopic observation optical instrument, specifically a binocular telescope, disclosed in the publication of unexamined Japanese patent application No. 7(1995)-43645 (which is hereinafter referred to as Document III) comprises a pair of right and left variable apex angle prisms, each of which is disposed between an objective lens, and an eyepiece lens of the respective telescopic optical system. It further comprises a vibration detection sensor for detecting vibrations in the body of the binocular device, a pair of actuators for actuating the variable apex angle prisms respectively, and a control circuit for determining the amount of motion according to the detected vibration.

Binocular telescopes incorporating a function for compensating for the deterioration of a telescopic optical image, (for example, due to image-shaking), described in the publication of unexamined Japanese patent application No. 10(1998)-20213 (which is hereinafter referred to as Document IV) comprises a pair of right and left correction lens, each disposed between an objective lens and an eyepiece lens of each of a pair of right and left telescopic optical systems, a vibration detection sensor device for detecting vibrations of the body of the binocular telescope, an actuator device for actuating both of the correction lenses at once, and a control circuit for determining the amount of motion according to the detected vibrations.

The optical image stabilizer systems described in Documents III and IV have the advantage of being relatively small in form factor but have the concomitant disadvantage of being able to compensate for a smaller range of correctable vibrations as compared with those systems described in Documents I and II.

SUMMARY OF EMBODIMENTS OF THE INVENTION

The image stabilizing device and system of the present apparatus advantageously provides an image stabilizing device for a binocular telescope which is free from the deterioration in the telescopic optical images viewed through the right and left telescopic optical systems due to the differences in visual appearance arising out of disconformities in the physical relationship among the optical components between juxtaposed telescopic optical systems when the image stabilizing device reacts to compensate for horizontal vibrations or motions.

The image stabilizing device and system of this concept also advantageously provides an image stabilizing device comprising a system to drive or actuate a gimbal device, constituting a key component of the image stabilizing device which is readily miniaturized, reduced in weight, and of relatively low cost to manufacture.

In a representative embodiment of the image stabilizing device and system disclosed herein, there is provided an image stabilizing device for a binocular telescope, which has a pair of telescopic optical, systems comprising objective lenses, erecting prisms, and eyepiece lenses coaxially arranged in this order and installed in parallel in a binocular housing. Each erecting prism is pivotally supported by a gimbal device so as to be capable of rotating on horizontal first and vertical second axes of rotation intersecting an optical axis of the telescopic optical system in order to compensate for deterioration in a telescopic optical mage resulting from, external vibrations. The gimbal device on which both of the erecting prisms are mounted comprises a gimbal casing fixedly mounted on the binocular housing, an external gimbal frame rotatably mounted on the gimbal casing so as to rotate on the horizontal first axis of rotation, and a pair of internal gimbal frames rotatably mounted on the external gimbal frame, each of which fixedly holds the erecting prism thereon and is rotatably mounted on the external gimbal frame so as to rotate on the vertical second axis of rotation. The image stabilizing device of the present concept also comprises an angular velocity detector for detecting an angular displacement of at least one of the internal gimbal frames, a voice coil motor disposed between the gimbal casing and the external gimbal frame for rotating the external gimbal frame on the horizontal first axis of rotation, and a voice coil motor disposed between the external gimbal frame and each internal gimbal frame for rotating each internal gimbal frame on the vertical second axis of rotation.

The voice coil motors are characterized in that each is comprised of a first yoke structure which has a permanent magnet mounted thereon, and second yoke structure which has a looped coil with an empty space therein and a position detection device disposed in the empty space of the looped coil for providing position information indicating a relative position of the looped coil to the permanent magnet.

Each voice coil motor is partially mounted on the external gimbal frame through at least either one of the first and second yoke structures, and preferably the second yoke structure in a representative embodiment disclosed herein. At least one of the first and second yoke structures of the voice coil motor may be partially embedded in the external gimbal frame.

The angular velocity detector may be of a biaxial type capable of detecting vertical and horizontal components of angular velocity of vibrations of either one of the pair of internal gimbal frames. In this case, the biaxial angular velocity detection sensor may be disposed only between the external gimbal frame and either one of the pair of internal gimbal frames.

In accordance with an alternative embodiment of the present invention, the image stabilizing device and system is further provided with a drive controller for providing control of the voice coil motor for driving the external gimbal frame based on position information and angular velocity information of the external gimbal frame provided by the position detection device relative to the external gimbal frame and the angular velocity detector relative to either one of the internal gimbal frames, respectively.

The image stabilizing device and system embodiments disclosed herein are capable of compensating for deterioration in the quality of a telescopic optical image, that is, an observed image, which follows hand shake generated by external vibrations imparted to a hand-held binocular telescope. In addition, this image stabilizing device and system enables the gimbal drive mechanism to be simplified, miniaturized, and produced at a reduced manufacturing cost. Particularly, since the image stabilizing device and system obviates the problem of telescopic optical images created by the right and left telescopic optical systems being different in visual appearance when the image stabilizing device reacts to deal with horizontal vibrations or motions, the image stabilizing device and system is also widely applicable to the field of laser distance ranging devices as well as binocular telescopes while also providing the same benefits in overall miniaturization and manufacturing cost reduction.

BRIEF DESCRIPTION OF THE DRAWING

The aforementioned and other advantages, features, and objects of the present embodiments and the manner of attaining them, will become more fully understood by reference to the following detailed description, when read in conjunction with the accompanying drawing, wherein.

DESCRIPTION OF PREFERRED
EMBODIMENTS OF THE INVENTION

Figure 1A:
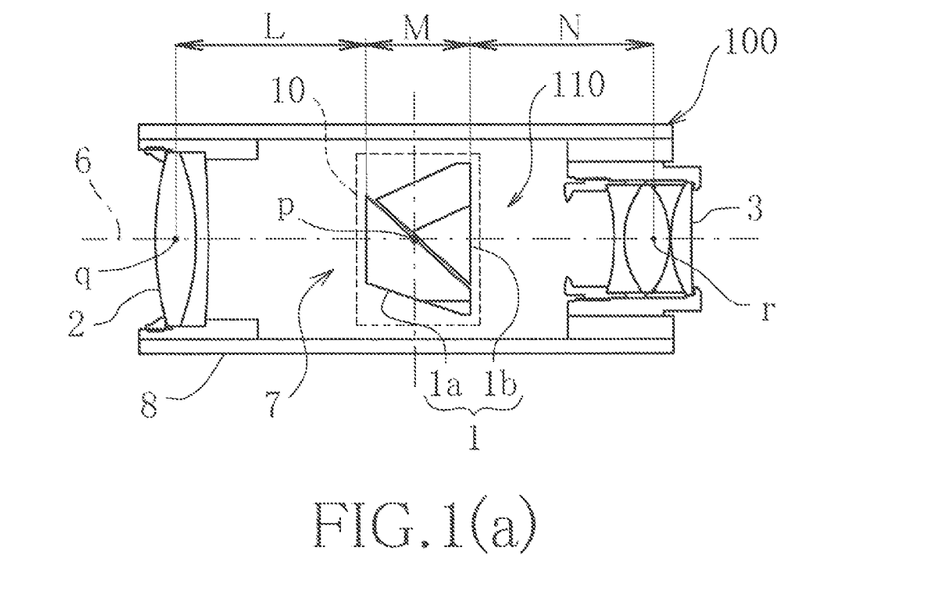
FIG. 1(a) is a cut-away, elevational, schematic illustration showing a portion of a binocular telescope in which an image stabilizing device and system in accordance with an embodiment of the present invention is installed.
Figure 1B:
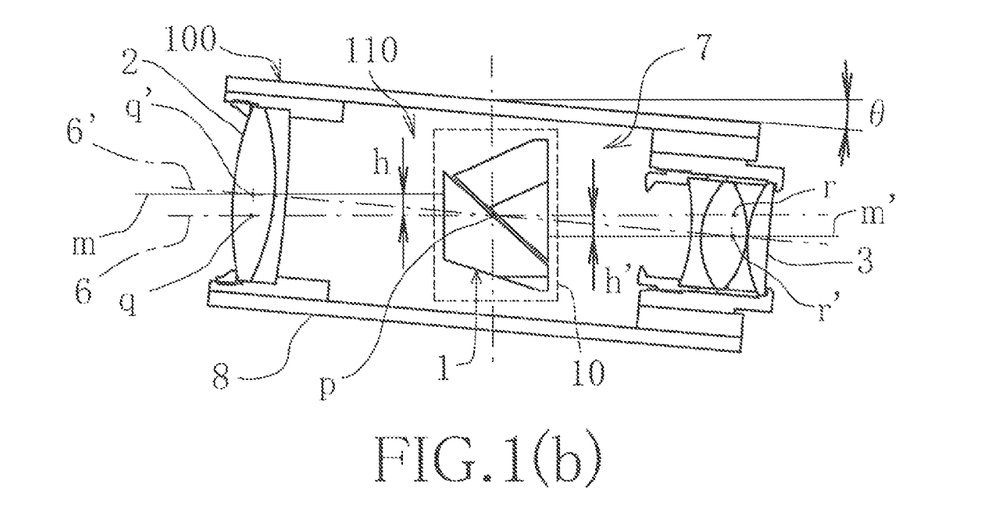
FIG. 1(b) is a follow-on schematic illustration of the portion of the binocular telescope of the preceding FIG. 1(a) showing the basic operational principles of the image stabilizing device and system.

FIGS. 1(a) and 1(b) show a portion of an telescopic optical instrument 100, such as a binocular telescope, having a pair of telescopic optical systems 7 (only one of which is illustrated for simplification). The telescopic optical system per se constitutes an optical system of an image stabilizing device when combined with the binocular telescope. As shown, the telescopic optical system 7 comprises an objective lens 2, an erecting prism 1, and an eyepiece lens 3 coaxially arranged in this order. This telescopic optical system, namely stabilizing optical system 7, can serve as a stabilizing optical system of an image stabilizing device 110 by virtue of supporting the erecting prism 1 on a gimbal device 10 so as to enable the movement of the erecting prism on two axes perpendicularly intersecting each other. In the case that the telescopic optical instrument 100 is a binocular telescope, a pair of telescopic optical systems 7 capable of serving as stabilizing optical systems can be incorporated side-by-side in an image stabilizing device of the binocular telescope.

Specifically, as described above, telescopic optical system 7 is comprised of a stationary objective lens 2, a movable eyepiece lens 3, and an erecting prism 1 disposed between and coaxially with the objective lens 2 and the eyepiece lens 3. The telescopic optical system has optical axis 6 incorporated in housing 8 of the telescopic optical instrument, or binocular telescope. The gimbal device which is mounted on the instrument housing holds a pair of the erecting prisms so as to enable the erecting prisms 1 to rotate on horizontal and vertical axes of rotation perpendicularly intersecting each other and the respective optical axes 6 at predetermined points on the optical axes of the telescopic optical systems. The telescopic optical system, namely stabilizing optical system 7 thus structured, serves as image stabilizing device 110 in combination with gimbal device 10.

The image stabilizing device 110 retains the erecting prism 1 in its primary or initial state (shown in FIG. 1(a)) where the erecting prism is positioned before being affected by external vibrations which may be applied, to the instrument housing S such as when telescopic instrument 100 causes angular displacements or motions of the longitudinal axis as shown in FIG. 1(b).

Various types of erecting prisms including, for example, a Schmidt erecting prism or an Abbe erecting prism, among others, can be employed. In FIGS. 1(a) and 1(b), a Schmidt erecting prism is employed as erecting prism 1. As is well known in the art, the Schmidt erecting prism, which is comprised of two prisms 1a and 1b, one of which is a roof prism (Dachkanteprisma), carries out of the function of aligning an optical axis of an incident ray of light thereon and an optical axis of an exit ray of light therefrom with respect to each other.

The gimbal device 10 shown in FIG. 1(a) has two axes of rotation perpendicularly intersecting each other, namely a first axis of rotation extending in a horizontal direction and a second axis of rotation extending in a vertical direction, both intersecting the optical axis 6 of the telescopic optical axis, namely the stabilizing optical system 7 of the binocular telescope 100 at right angles. As clearly shown in FIG. 1(a), an intersection point p drawn on telescopic optical axis 6 at which the horizontal first and vertical second axes of rotation intersect the optical axis at right angles is a middle point of the total length S (defined below) of an optical path length L from the objective lens 2 to an incident surface of the erecting prism 1, a mechanical length M between the incident surface and an exit surface of the erecting prism 1, and an optical path length N from the exit surface of the erecting prism to the eyepiece lens 3 (S=L+M+N). Since it is customary that either one of the objective lens 2 and the eyepiece lens 3 may be made up of a plurality of component lens elements, each having a given thickness, the intersection point p at which the horizontal first and vertical second axes of rotation intersect the optical axis 6 is strictly at a middle point of the total length of an optical path length L from a rear or image side principal point of the objective lens 2 to the plane of incidence of the erecting prism 1, a mechanical length M between the plane of incidence and the plane of exit of the erecting prism 1, and an optical path length N from the plane of exit of the erecting prism 1 to a front or object side principal, point of the eyepiece lens 3. The objective lens 2 and the eyepiece lens 3 are hereinafter explained in the form of this lens system.

The basic principle of operation of image stabilizing device 110 will be explained with reference to FIG. 1(b). The binocular telescope 100 in an initial state shown in FIG. 1(a) is altered in position into an inclined state wherein the binocular housing 8 inclines at, for example, an angle of θ as indicated in FIG. 1(b). This can result from vibrations imparted to housing 8 due to user hand shake to the binocular housing in the initial state. The objective lens 2 and the eyepiece lens 3, which are mechanically coupled to binocular housing 8, change their position, to the inclined state concurrently with the inclination of the optical axis 6 (the optical axis in the inclined state is denoted by reference numeral 6'). Then, in the case wherein the erecting prism 1 of the gimbal device 10 is controlled so as to remain in the same orientation as in the initial state, a ray of incident light m passing through a center q' of the objective lens 2 in the inclined state and traveling in a direction parallel to the optical, axis 6 in the initial state just before the inclining of the binocular housing 8 at an angle of θ enters the erecting prism 1 along an axial line laterally shifted by a distance h which is in parallel with the optical axis 6 in the initial state. By virtue of the optical property of the erecting prism that an optical axis of incident light and an optical axis of exit light (an incident optical axis and an exit optical axis) are collinearly aligned with each other, the ray of incident light m exits as a ray of exit light m' from the erecting prism 1 along an axial line laterally shifted on an opposite side by a distance h' which is in parallel with the optical axis 6 in the initial, state and then passes through the eyepiece lens 3 at its center r' in the inclined state. Consequently, since the outgoing ray of light m' passing through the eyepiece lens 3 at the center r' in the inclined state travels in a direction parallel, to the optical axis 6 in the initial state just before any application of vibrations, the binocular telescope 100 is capable of providing an unshaken and distinct image even when encountering or being affected by vibrations.

Although the description in connection with FIG. 1(b) is provided in the case where the axes of rotation of the gimbal device 10 are set up at the center p of the erecting prism 1 in the axial direction, the erecting prism may be axially displaced from the horizontal first and vertical second axes of rotation as long as the intersection point p at which the horizontal first and vertical second axes of rotation intersect the optical axis 6 satisfies the geometric condition described above.

Figure 2:
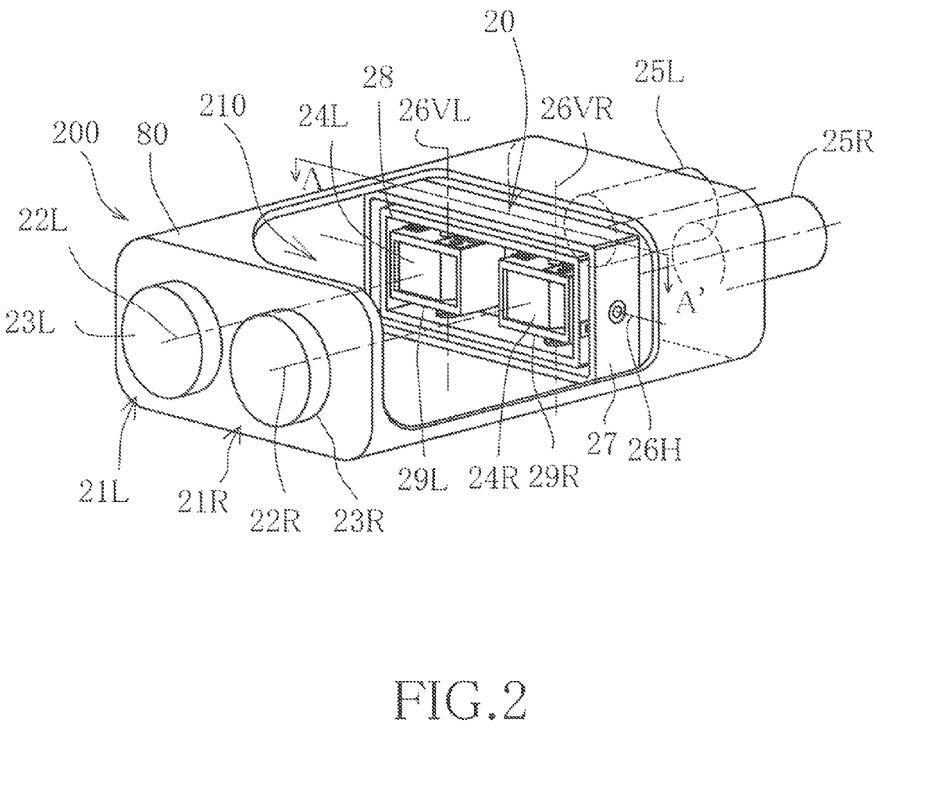
FIG. 2 is a partially cut-away, perspective schematic illustration showing a binocular telescope in which an image stabilizing device and system in accordance with an embodiment of the present invention is incorporated.

FIG. 2 is a partial perspective view showing a binocular telescope 200 having a binocular housing 80 in which an image stabilizing device 210 of an embodiment of the present invention is incorporated. The binocular telescope is basically comprised of a pair of the telescopic optical systems 7 shown in FIG. 1(a) as right and left telescopic optical systems 21R and 21L fixedly interconnected in such a configuration that optical axes 22R and 22L of the right and left telescopic optical systems 21R and 21L are parallel to each other. The telescopic optical systems 21R and 21L include a gimbal device 20 with the erecting prisms 1 mounted thereon, respectively.

The right telescopic optical system 21R is comprised of a right objective lens 23R, a right erecting prism 24R, and a right eyepiece lens 25R coaxially arranged in this order in binocular housing 80. Similarly, the left telescopic optical system 21L is comprised of a left objective lens 23L, a left erecting prism 24L, and a left eyepiece lens 25L coaxially arranged in this order in the binocular housing. The right and left objective lenses 23R and 23L are fixedly mounted on the binocular housing 80, and the right and left eyepiece lenses 25R and 25L are movably mounted on the binocular housing. The right and left erecting prisms 24R and 24L are mounted on a gimbal device 20 so as to rotate about two axes orthogonally intersecting with each other in a plane perpendicular to the right and left optical axes 22R and 22L, of the right and left telescopic optical, systems 21R and 21L. In FIG. 2, a pupil distance adjusting mechanism, a focusing mechanism and other necessary mechanisms, and parts which may be incorporated in the binocular telescope 200 have been omitted in FIG. 2 to avoid further complication of the illustration and to facilitate understanding of the principles of the present invention.

The gimbal device 20 comprises a gimbal casing 27 in the form of a generally horizontally elongated, rectangular frame through which the gimbal device 20 is fixedly received in the binocular housing 80 and an external gimbal frame 28 similar in shape to the gimbal casing 27 and suspended within gimbal casing 27, The gimbal device 20 also includes a pair of, or right, and left, internal gimbal frames 29R and 29L in the form of generally rectilinear elements which fixedly mount the right and left erecting prisms 24R an 24L therein respectively. The external gimbal frame 28 is mounted for rotation on a horizontal first axis of rotation 26H in gimbal casing 27. On the other hand, the right and left internal gimbal frames 29R and 29L are mounted for rotation on vertical axes of rotation 26VR and 26VL collaterally arranged in the external gimbal frame 28. The horizontal first rotational axis intersects both the right, and left optical, axes 22R and 22C of the right and left telescopic optical systems 21R and 21L. The vertical rotational axes 26VR and 26VL intersect the right and left optical axes 22R and 22L of the right and left telescopic optical systems 21R and 21L at intersection points, respectively, at which the horizontal first rotational axis 26H intersects the right and left optical axes 22R and 22L of the right and left telescopic optical systems 21R and 21L.

The right and left telescopic optical systems 21R and 21L generally require having their optical axes 22R and 22L controlled in parallelism more strictly in a horizontal direction than in a vertical direction. Therefore, it is desirable for the image stabilizing device 210 of binocular telescope 200 to drive the right and left erecting prisms 24R and 24L in synchronism with each other in compensating for deterioration of a telescopic optical image or an observed image which is induced by vertical vibratory motions or vertical user hand shake applied to the binocular housing 80. In this regard, it has a beneficial effect that the image stabilizing device 110 is equipped with a gimbal device having a laterally elongated, horizontal-pivoted configuration, as shown in FIG. 2. An image stabilizing device and system in accordance with this concept is characterized in configuration in that the gimbal device includes split-yoke type voice coil motors as drive units.

Briefly, the image stabilizing device and system embodiment of the present invention is equipped with three units of split-yoke type voice coil motors serving as drive mechanisms for driving and servo controlling the gimbal device with erecting prisms 1 mounted thereon for compensation for deterioration of a telescopic, optical image or an observed image which is induced by vibratory motions or user hand shaking motions applied to the binocular housing.

Figure 3A:
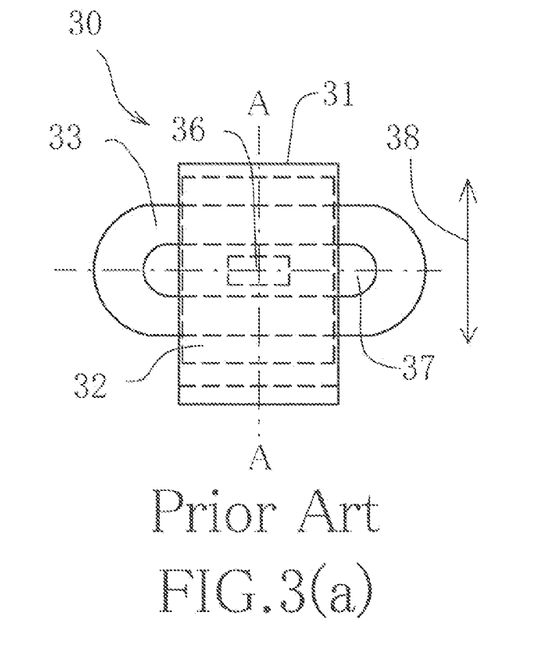
FIG. 3(a) is a schematic top plan view showing a basic structure of a voice coil motor which is generally known in the art.

As will be described later in connection with FIGS. 4(a), 4(b) and 5, the respective voice coil motors 40, 40L, 40R have first yoke members 46, 46L, 46R in the form of a generally flat, rectangular plate and second yoke members 60, 60L, 60R in the form of a generally flat, rectangular plate which are split from, and oppositely spaced apart from, each other. The first yoke members are provided with hollow or loop-shaped coils 43, 43L, 43R with position detection device's 44, 44L, 44R, disposed in empty spaces 49 (see FIGS. 4(a) and 4(b)) thereof. The position detection device 44, 44L, 44R may be, for example, magnetically sensitive devices, respectively, such as Hall Effect elements. The second yoke members 46, 46a, 46b are provided with square-plate permanent magnets 45, 45a, and 45b configured analogously to that shown in FIGS. 3(c) and 3(d), These first and second yoke members 46, 47, 46a, 46b, 47a, 47b are disposed in opposite positions at a prescribed distance therebetween and configured so as to be relatively movable.

In order to provide a clear and easy understanding of the distinctive structure of the voice coil motors 40, 40R, 40L employed in the image stabilizing device 210 of the present apparatus, a general voice coil motor 30, which is known in the art and widely used as a gimbal driving mechanism, will, be described in connection with FIGS. 3(a) to 3(d).

Figure 3B:
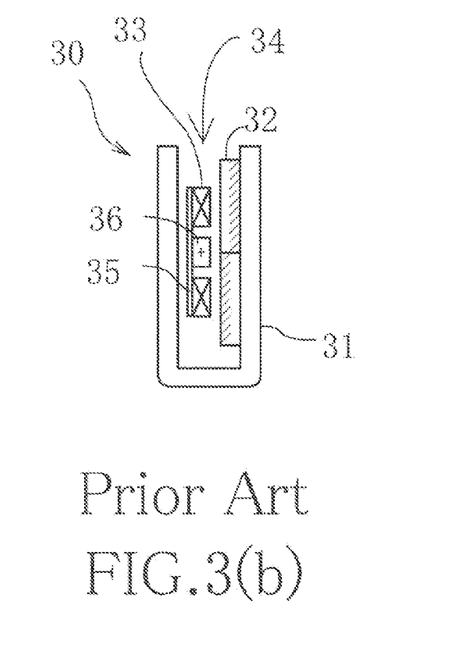
FIG. 3(b) is a schematic cross-sectional view showing the voice coil motor taken along a line A-A in FIG. 3(a)
Figure 3C:
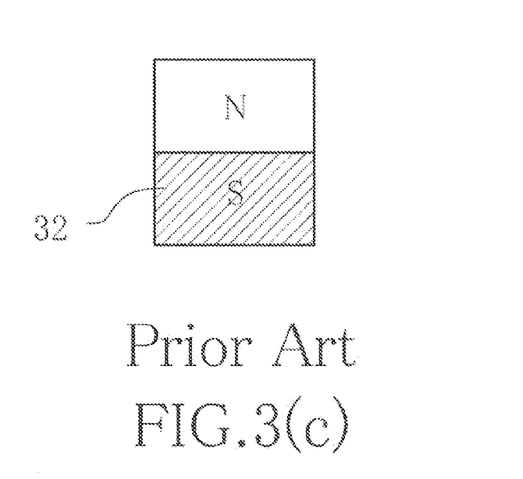
FIG. 3(c) is a top plan view showing a permanent magnet to be incorporated in the voice coil motor shown in FIG. 3(b)
Figure 3D:
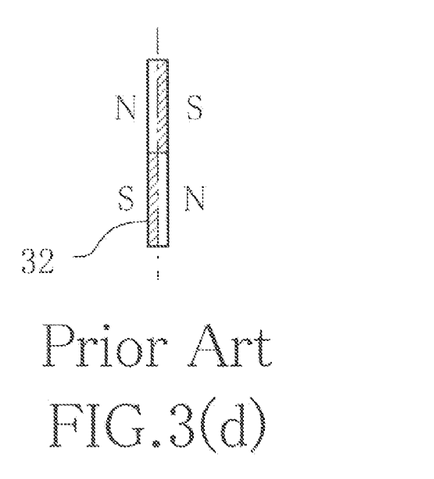
FIG. 3(d) is a cross-sectional view showing the permanent magnet shown in FIG. 3(c)

As shown, a conventional voice coil motor 30 is comprised of a stationary yoke member 31 in the form of U-shaped iron core with an empty space 34 defined between the opposed inner faces of the U-shaped stationary yoke member 31 and a permanent magnet 32 mounted on one of the opposed inner faces of the U-shaped stationary yoke member 31. The conventional voice coil motor 30 also includes a loop-shaped coil 33 formed with an empty space 37 mounted on a carrier board 35 movably disposed in the empty space 34 of the U-shaped stationary yoke member 31 and a position detection device 36 mounted on the carrier board or printed circuit board 35 at a center in the empty space 34 of the loop-shaped coil 33. As specifically illustrated in FIGS. 3(c) and 3(d), the permanent magnet 32 is made up of a square-plate of a powerful permanent magnet and is spatially divided into two halves bounded by the center line. The two halves of the square-plate are perpendicularly magnetized in reverse polarity in the direction of thickness so as to have reverse polarities, namely an S magnetic polarity (shaded in the drawings) and an N magnetic polarity, it should be noted that, in order to gain a better understanding in the following description, those magnetized in the S magnetic polarity are shaded throughout the attached drawings. This arrangement of the permanent magnet 32 mounted on one of the opposite inner faces of the U-shaped stationary yoke member 31 as shown in FIG. 3(b) develops a magnetic field in the empty space 34 of the stationary yoke member 31 which is perpendicular to the opposite inner faces of the U-shaped stationary yoke member 31 and is reversed in direction when loop-shaped coil 33 moves crossing the boundary center line of the permanent magnet 32. Therefore, when applying an electric current through the loop-shaped coil 33 movably disposed in the empty space 34 of the U-shaped stationary yoke member 31 with the magnetic field, thus developed, the loop-shaped coil 33 is forced to move in either direction indicated by an arrow 38 (FIG. 3(a)), depending on the direction of the current flow. Consequently, when linking an object member to be moved (not shown) with the carrier board 35, the voice coil motor 30 is capable of imparting a linear motion to the object member.

Further, since having the position detection device 36 such as, for instance, a Hall effect element or a magnetically sensitive element like a magneto resistive element, which is disposed in the empty space 34 of the loop-shaped coil 36, the voice coil motor 30 is capable of providing a position signal indicating a displacement in the position of the loop-shaped coil 33. When disposing voice coil motor 30 so that the position detection device 36 falls on the boundary between the N magnetic polarity and the S magnetic polarity of the permanent magnet 32 in its initial state, the position detection device 36 provides an output of zero. This arrangement is quite useful for the setting of an initial reference position of the voice coil motor 30 in the initial state.

In the prior art, the combination of a rotary type drive motor for rotating shafts from which the gimbal device is suspended and position detection devices such as a potentiometer are employed as gimbal driving devices is known, for example, as depicted in Document II. However, a rotary shaft driving motor is relatively large in terms of size as compared with gimbal frames and is bound by installation location and dimensional features such as diameter and thickness. Consequently, this imposes restrictions on overall miniaturization and weight savings in conjunction with an image stabilizing device.

By contrast with the gimbal driving device in a conventional optical image stabilizer, a voice coil motor 40 is employed as the gimbal driving mechanism in the image stabilizing device and system of the present invention. As will be described in more detail in connection with FIGS. 4(a) and 4(b) later, this voice coil motor 40 comprises a pair of yoke members in the form of a relatively thin rectangular flat plates, either one of which is provided with a position detection device incorporated in an empty space of a loop-shaped coil. The voice coil motor 40 thus constituted provides broad options for installation locations, so as to thereby increase the degree of design freedom and, in consequence, to allow for a smaller and lighter image stabilizing device. This feature enables the voice coil motor to be incorporated in the image stabilization device under optimum conditions.

Figure 4A:
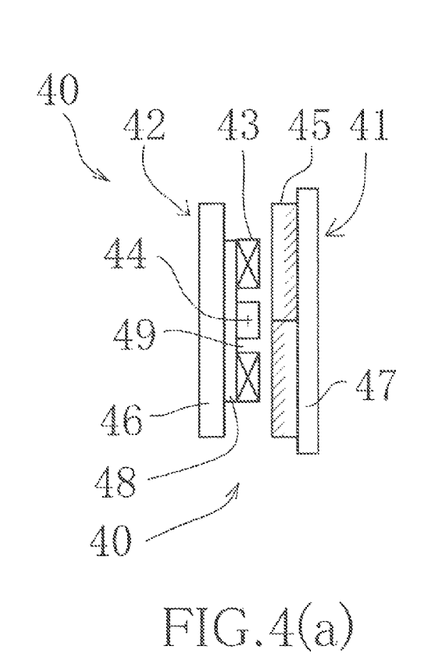
FIG. 4(a) is a schematic cross-sectional view showing a split-yoke type voice coil, motor which may be incorporated into the image stabilizing device in accordance with embodiments of the present invention.
Figure 4B:
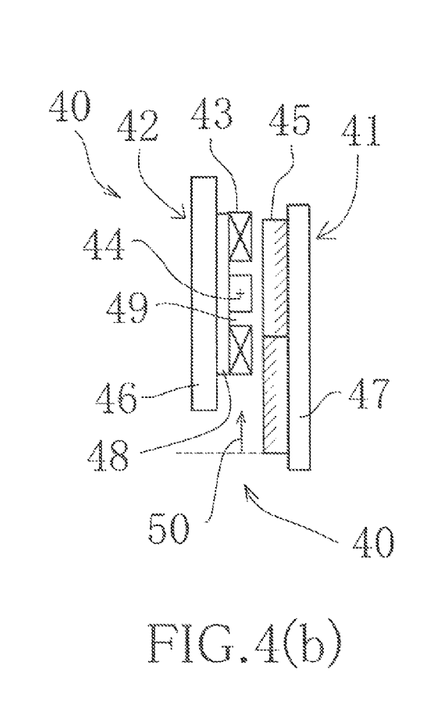
FIG. 4(b) is a schematic cross-sectional view showing the split-yoke type voice coil motor illustrated in FIG. 4(a) in an activated state in which a looped coil is moved relative to a permanent magnet.

Referring specifically to FIGS. 4(a) and 4(b), the split-yoke type voice coil motor 40 suitably used in the image stabilizing device 210 according to a preferred embodiment of the present invention is shown. The voice coil motor 40 (which is referred to as an external gimbal frame drive voice coil motor) 40 is characterized by separated movable yoke members in place of the conventional U-shaped stationary yoke member illustrated in FIGS. 3(a) and 3(b).

The voice coil motor 40 has a first yoke member 41 including a permanent magnet 45 similar to that of the conventional voice coil motor 30, and a second yoke member 42 including a loop-shaped coil 43 and a position detection device 44 such as, for instance, a magnetically sensitive element like a Hall effect element. More specifically, the first yoke member 41 is comprised of the permanent magnet 45, and a first member 47 in the form of a relatively thin rectangular flat plate on which the permanent magnet 45 is fixedly mounted. The loop-shaped coil 43 and the permanent magnet 45 are related in function to those used in the conventional voice coil motor 30 shown in FIG. 3(a) through 3(d). The second yoke member 42 is comprised of a second member 46 in the form of a relatively thin rectangular flat plate to which a carrier board 48 is fixedly attached, loop-shaped coil 43 formed with an empty space 49, and a position detection device 44 positioned at a center of the empty space 49. The loop-shaped coil 43 and the position detection device 44 are fixedly mounted on the carrier board 48. The first and second yoke members 41 and 42 are spaced with a specified air space therebetween and capable of a relative displacement with respect to each other. In the case where the first yoke member 41 is stationary or is a stator, for instance, second yoke member 42, which works together with, the loop-shaped coil 43 as a movable body, moves relative to first yoke member 43 in the direction, for instance indicated by an arrow 50 in FIG. 4(b), depending on the direction of an electric current flow applied to the loop-shaped coil 43 of the second yoke member 42. Conversely, in the instance where the second yoke member 42 is stationary or is a stator, the first yoke member 41 with the permanent magnet 45 moves as a movable body relative to the second yoke member 42.

Figure 5:
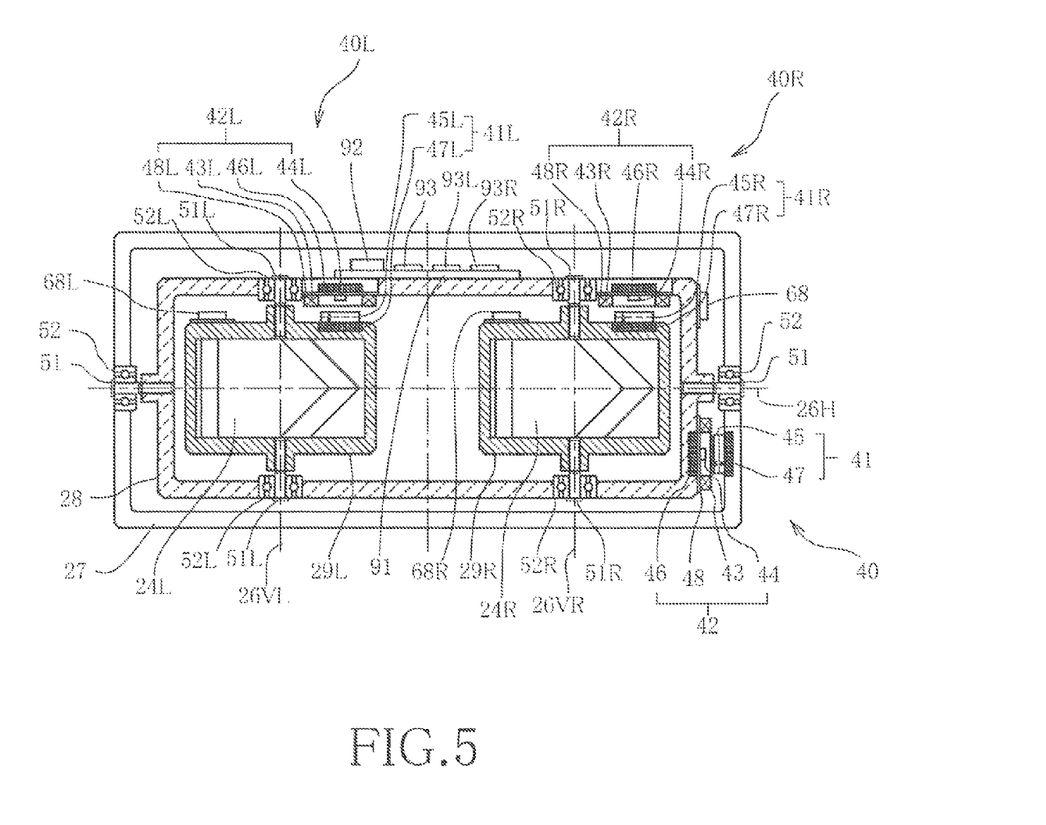
FIG. 5 is a cut-away, schematic front elevational view showing a gimbal device which for incorporation in the image stabilizing device and system of FIG. 2.

FIG. 5 is a cross-sectional view of the details of the gimbal device 20 taken along section line A-A in FIG. 2. Gimbal device 20, which constitutes a key component of the image stabilizing device and system 210, comprises a gimbal casing 27 in the form of a generally horizontally elongated rectangular frame, an external gimbal frame 28 similar in shape to the gimbal casing 27, and a pair of, or right and left, internal gimbal casings 29R and 29L similar in shape to the erecting prisms 24R and 24L. The gimbal device 20 is fixedly received in binocular housing 80 through gimbal casing 27. The external gimbal frame 28 is received in and pivotally mounted to gimbal casing 27 by lateral pivot shafts 51 on external gimbal frame 28, and bearings 52 in gimbal casing 27. This structure provides external gimbal frame 28 with the horizontal first axis of rotation 26H perpendicular to the optical axes 22R and 22L of the right and left telescopic optical systems 21R and 21L in the horizontal direction. The right internal gimbal frame 29R is received in and pivotally mounted to the external gimbal frame 28 by vertical pivot shafts 51R on the right internal gimbal frame 29R and bearings 52R in the external gimbal frame 28. This structure provides the right internal gimbal frame 29R with the vertical second axis of rotation. 26VR perpendicular to the optical axis 22R of the right telescopic optical system 21R in the vertical direction. Similarly, the left internal gimbal frame 29L is received in and pivotally mounted to the external gimbal frame 28 in an adjacent arrangement to the right internal gimbal frame 29R by vertical pivot shafts 51L on the left internal gimbal frame 29L, and bearings 52L in the internal gimbal frame 28. This structure also provides the left internal gimbal frame 29L, with the vertical second axis of rotation 26VL perpendicular to the optical axis 22L of the left telescopic optical system 21L, in the vertical direction.

Figure 6:
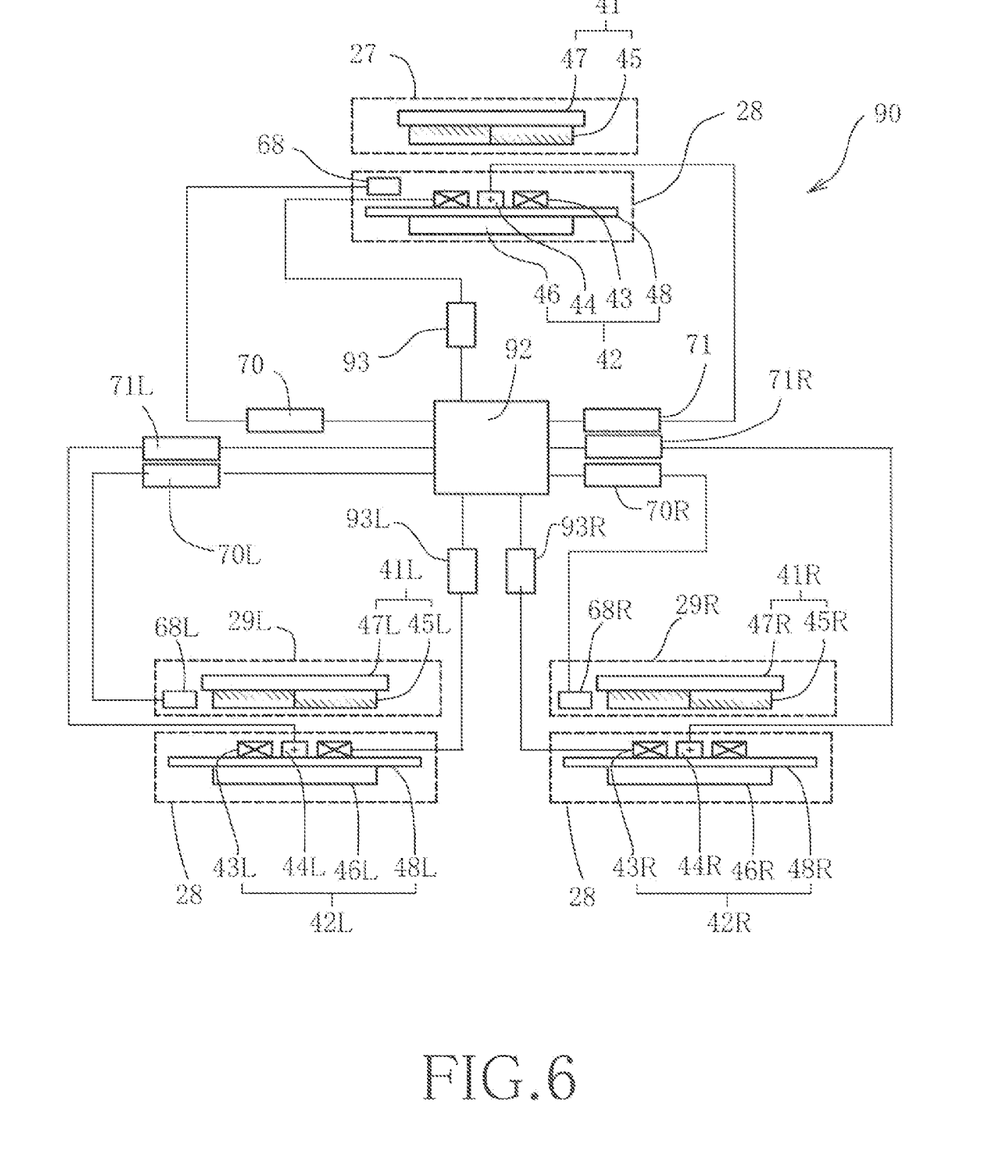
FIG. 6 is a functional block diagram showing an example of a servo drive control system for performing servo drive control of three units of voice coil motors incorporated in the image stabilizing device and system of FIG. 5.

As shown in FIGS. 5 and 6, the gimbal device 20 further comprises of three units of split-yoke type voice coil motors, namely a first voice coil motor unit 40 for activating the external gimbal frame 28, a second right voice coil motor unit 40R for activating the right internal gimbal frame 29R, and a second left voice coil motor unit 40L, for activating the left internal gimbal frame 29L.

The first voice coil motor unit 40 is made up of first yoke member 41 as a stator which comprises a permanent magnet 45 and a first member 47 on which permanent magnet 45 is fixedly mounted, and second yoke member 42 as a movable body which is comprised of a second member 46, a loop-shaped coil 43 with an elliptical empty space (refer to the space 49 shown in FIGS. 4(a) and 4(b)) and a position detection device 44 positioned in the empty space 49 of the loop-shaped coil 43. The loop-shaped coil 43 and position detection device 44 are fixedly mounted on the second member 46. The first yoke member 41 and the second yoke member 42 are separately and oppositely arranged between the gimbal casing 27 and the external gimbal frame 28, displaced by an appropriate air space or distance.

The first yoke member 47 of the first yoke member 41 and the second yoke member 46 of the second yoke member 42 may be at least, partially embedded in lateral wall portions of the gimbal casing 27 and the external gimbal frame 28, respectively. In addition, the split-yoke structure enables the first or external gimbal frame drive voice coil motor 40 per se to be relatively small in size, as this embedded structure of the first voice coil motor 40 with the split-yoke structure results in a small space which the first voice coil motor 40 occupies and provides the beneficial effect that the gimbal device 20 can be made small in overall size as a consequence.

An angular velocity sensor device 68, which is fixedly mounted on the external gimbal frame 28, may be associated with the first voice coil motor 40 where the external gimbal frame is required to be driven independently.

Similarly, the second right and left voice coil motor units 40R and 40L, which may conveniently be identical in structure with the first voice coil motor 40, are made up of first yoke members 41R, 41L as stators and second yoke members 42R, 42L as movable bodies, respectively. Each first yoke member 42R, 42L comprises a permanent magnet 45R, 45L and a first member 47R, 47L on which the permanent magnets 45R, 45L are fixedly mounted. Each second yoke member 42R, 42L comprises a second member 46R, 46L, a loop-shaped coil 43R, 43L with an elliptical empty space (refer to the space 49 shown in FIGS. 4(a) and 4(b)), and a position detection device 44R, 44L positioned in the empty space of the loop-shaped coil 43R, 43L. These loop-shaped coils 43R, 43L and position detection devices 44R, 44L are fixedly mounted on the second members 46R, 46L. The first yoke member 41R, 41L and the second yoke member 42R, 42L are separately arranged oppositely between the gimbal casing 27 and the external gimbal frame 28, spaced by a specified air space or distance.

The first members 47R, 47L of the first yoke member 41 and the second member 46 of the second yoke member 42R, 42L may be conveniently at least partially embedded in the lateral wall portions of the external gimbal frame 28 and the internal gimbal frames 29R, 29L, respectively. In addition, the split-yoke structure enables the second right and left, or right and left internal gimbal frame drive, voice coil motor 40R, 40L to be made small in overall size and the embedded structure of the second voice coil motors 40R, 40L, results in a small space between the external casing 28 and the internal, gimbal frames 29R, 29L, which the second right and left voice coil motors 40R and 40L occupy respectively, and provides the beneficial effect that the gimbal devices 20R, 20L can be made small in physical size as a consequence.

Angular velocity sensor devices 68R and 68L, which, are fixedly mounted on the right and left internal gimbal frames 29R and 29L, may be associated with the second right and left voice coil motors 40R and 40L, respectively, in that case where the right and left Internal gimbal frames 29R and 29L are desired to be driven independently.

As illustrated, the gimbal device 20 may also be provided with a circuit board 91 on the external gimbal frame 28. The circuit board can be located spatially between the right and left internal gimbal frames 29R and 29L and include a servo control circuit system 90 as shown in FIG. 6. This servo control circuit system 90 includes a processing unit (microcomputer, microprocessor, microcontroller, and the like) 92 shared by the three voice coil motors 40, 40R and 40L, and driver circuits 93, 93R and 93L associated respectively with the voice coil motors 40, 40R and 40L. The processing unit 92 carries out and controls the operation of signals for controlling the voice coil motors 40, 40R and 40L based on information of their respective positions provided by the position detection devices 44, 44R and 44L of the voice coil motors 40, 40R and 40L and the information of angular displacements provided by the angular velocity sensor devices 68, 68R and 68L affiliated with the voice coil motors 40, 40R and 40L, respectively. This in centrally located arrangement of the processing unit 92 and the driver circuits 93, 93R and 93L on the circuit board 91 provides for simplified connections of signal wires to the voice coil motors 40, 40R and 40L.

Referring to FIG. 6, a functional block diagram of a servo control system 90 for controlling the voice coil motors 40, 40R and 40L independently is illustrated. The processing unit 92 performs operations for providing control signals indicative of target positions of the external and right and left internal gimbal frames 28, 29R and 29L, respectively, based on position information from the position detection devices 44, 44R and 44L and angular velocity information from the angular velocity detection devices 68, 68R and 68L. This target, position is a position to which the gimbal frame is required to move or turn so as to cancel out the motion or displacement of the erecting prisms caused by external vibrations applied to the binocular telescope 200 and then provide feedback-control signals indicative of the target position to the driver circuits 93, 93R and 93L, respectively. The driver circuits 93, 93R and 93L apply electric current corresponding to the target position, respectively, to the loop-shaped, coils 43, 43R and 43L of the corresponding voice coil motors 40, 40R and 40L.

As described above, the first voice coil motor 40 for controlling the motion of the external gimbal frame 28 comprises the first and second yoke members 41 and 42. When vibrations, such as user hand shake, are applied to the binocular housing 80, the angular velocity detection device 68 mounted, on the external gimbal frame 28 detects a vertical component of vibration (rotational motion on the horizontal first axis of rotation 26H) and, at the same time, the position detection, device 44 mounted on the second yoke member 46 of the first voice coil motor 40 detects the relative position (or relative displacement) between the first and second yoke members 41 and 42. The processor unit 92 carries out an operation, for adjusting the target position of the external gimbal frame 28 for canceling out the rotational motion according to the vertical component of vibration based on information of the angular velocity of the external gimbal frame 28 and information with respect to the relative position between the first and second yoke members 41 and 42.

Then, the processor unit 92 provides a control signal representative of the target position to the driver circuit 93. The driver circuit 93 applies an electric current according to the control signal to the loop-shaped coil 43 of the first voice coil motor 40 and excites it so as to cause a relative movement between the first and second yoke members 41 and 42 toward the target position. The driver circuit 93 farther includes an amplifier circuit 70 for amplifying a signal from, the angular velocity detection device 68 and an amplifier circuit 71 for amplifying a signal from the position detection device 44. As is apparent, this servo control system 90 is configured as a double feedback loop for position servo control and angular velocity servo control.

The second right voice coil motor 40R for controlling the motions of the right internal gimbal frame 29R comprises first and second yoke members 41R and 42R. When vibrations are applied to the binocular housing 80, the angular velocity detection device 68R installed on the right internal gimbal frame 29R detects a horizontal component of this vibration, (rotational motion on the right vertical axis of rotation 26VR) and, at the same time, the position detection device 44R installed on the second yoke member 46R of the second right voice coil motor 40R detects the relative position (or relative displacement) between the first and second yoke members 41R and 42R. The processor unit 92 carries out the operation of the target position of the right internal gimbal frame 29R for canceling out the rotational motion according to the horizontal component of vibration based on information of the angular velocity of the right internal gimbal frame 29R and information of the relative positions with respect to the first and second yoke members 41R and 42R. Then, the processor unit 92 provides a control signal representative of the target position, to the driver circuit 93R. The driver circuit 93R applies an electric current according to the control signal to the loop-shaped coil 43R of the second right voice coil motor 40R and excites it so as to cause a relative displacement between the first and second yoke members 41R and 42R toward the target position. The driver circuit 93R further includes an amplifier circuit 70R for amplifying a signal from the angular velocity detection device 68R and an amplifier circuit 71R for amplifying a signal from the position detection device 44R. As is apparent, this servo control system 90 is configured as a double feedback loop for position servo control and angular velocity servo control.

In the same manner, the second left voice coil motor 40L for controlling the motion of the left Internal gimbal frame 28L comprises the first and second yoke members 41L and 42L. When vibrations are applied to the binocular housing 80, the angular velocity detection device 68L mounted on the left internal gimbal frame 29L detects the horizontal component of vibration (rotational motion on the right vertical axis of rotation 26VL) and, at the same time, the position detection device 44L, mounted on the second yoke member 46L of the second left voice coil motor 40L detects the relative position (or relative displacement) between the first and second yoke members 41L and 42L. The processor unit 92 carries out the operation of the target position of the left internal gimbal frame 29L for canceling out the rotational motion according to the horizontal component of vibration based on information of the angular velocity of the left internal gimbal frame 29L and information with respect to the relative position of the first and second yoke members 41L and 42L. Then, the processor unit 92 provides a control signal representative of the target position, to the driver circuit 93L. The driver circuit 93L applies an electric current, according to the control signal to the loop-shaped coil 43L of the second left voice coil motor 40L and excites it so as to cause a relative movement between first and second yoke members 41L and 42L toward the target position. The driver circuit 93L is also provided with an amplifier circuit 70L for amplifying a signal from the angular velocity detection device 68L and an amplifier circuit 71L for amplifying a signal from the position detection device 44L. As is apparent, this servo control system 90 is configured as a double feedback loop for position servo control and angular velocity servo control.

In order to execute servo controls for the external gimbal frame 28 and second right and left gimbal frames 29R and 29L of the gimbal device 20, it may be desirable to lay out the driver circuits 93, 93R and 93L independently for these gimbal frames as shown, for example, in FIG. 6.

Figure 7:
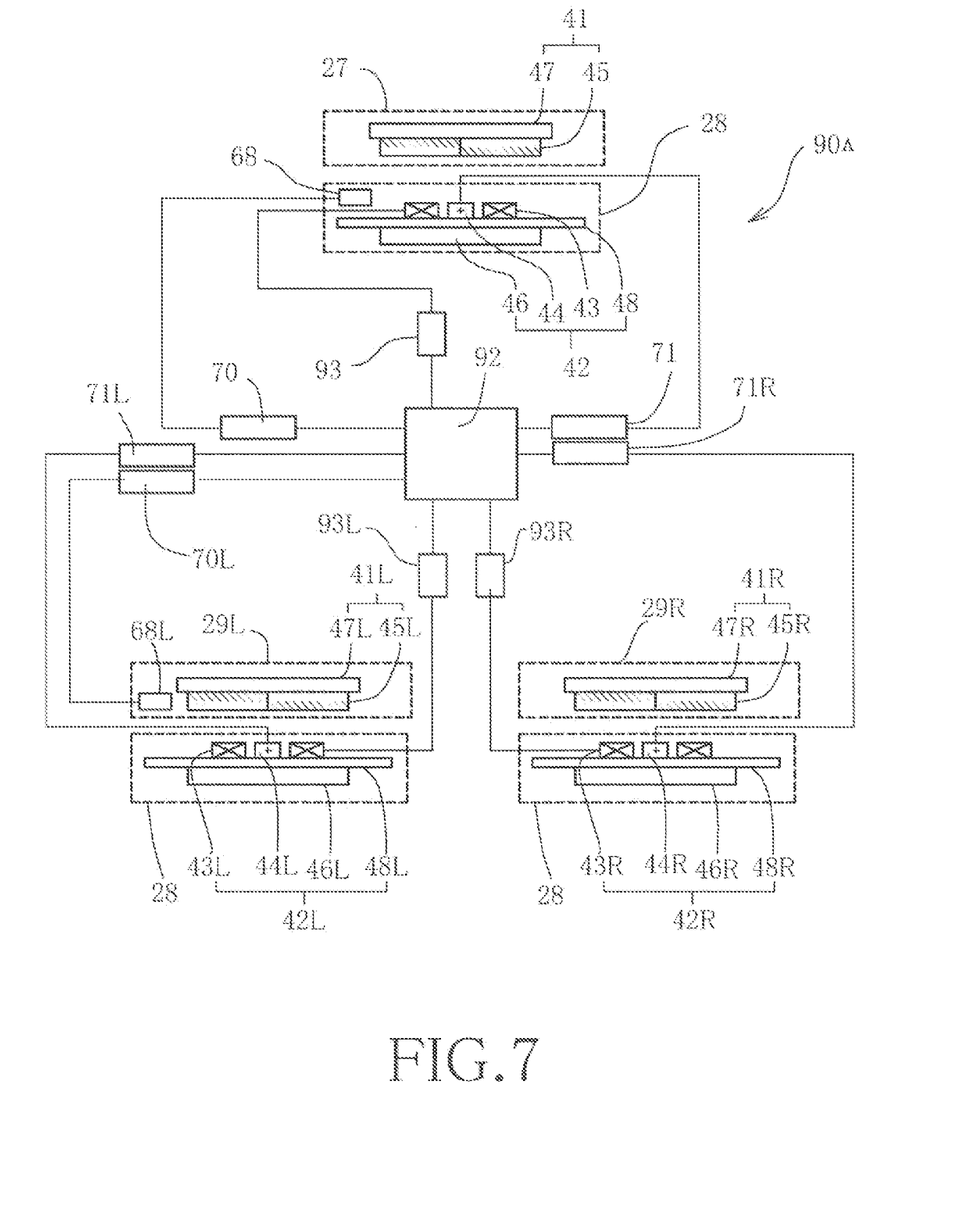
FIG. 7 is a functional block diagram showing an alternative example of a servo drive control system for performing servo drive control of three units of voice coil motors incorporated in the image stabilizing device and system of FIG. 5.

FIG. 7 is a functional block diagram illustrating an alternative servo control system 90A for synchronized drive control of the second right and left gimbal frames 29R and 29L of the gimbal device 20. This servo control system 90A is identical to the servo control system 90 shown in FIG. 6 except that the angular velocity detection device 68R of the right voice coil motor 40R is eliminated from the servo control system 90A and is also suitable for synchronous drive control of the right and left internal gimbal frames 29R and 29L.

When performing the synchronised servo drive control of the right and left internal gimbal frames 29R and 29L, it may be possible to share a signal indicative of the angular velocity information provided from either one of the angular velocity detection devices 68R and 68L. In the servo drive control system 90A shown in FIG. 7, the angular velocity detection device 68L on the left internal gimbal frame 29L is shared for the purpose of providing a signal representative of angular velocity information. That is, target positions of the right and left internal gimbal frames 29R and 29L, are determined based on information of the angular velocity from the angular velocity detection device 68L in combination with information of the relative positions from the position detection devices 44R and 44L of the second right and left voice coil motors 40R and 40L, respectively. As is the case with the servo drive control system 90 shown in FIG. 6, the servo drive control system 90A is configured as a double feedback loop for position servo control and angular velocity servo control as well and enabling synchronized drive control of the second right and left gimbal frames 29R and 29L of the gimbal device 20. The servo drive control system 90A allows for the omission of either one of the angular velocity detection devices 68R and 68L and, as a consequence, provides for reduced component count and resultant cost savings.

Figure 8:
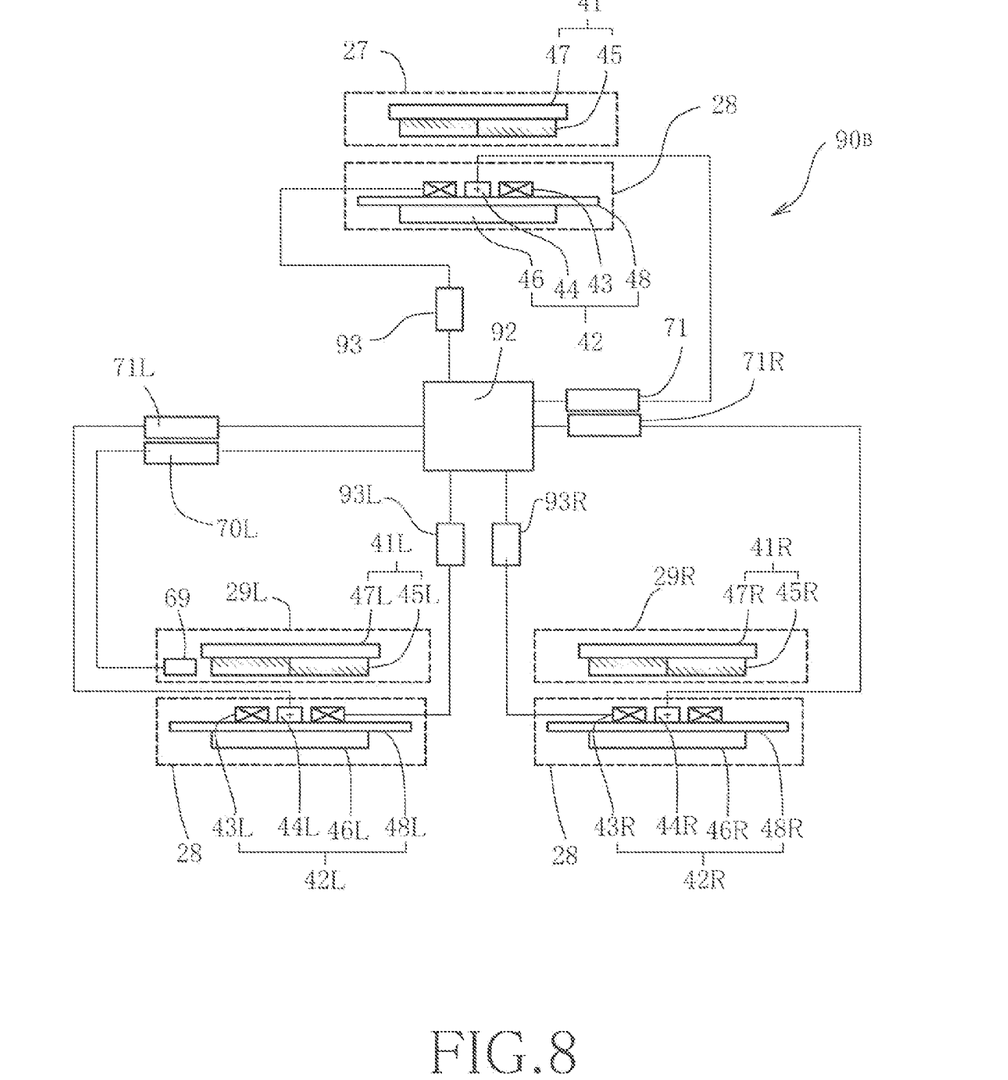
FIG. 8 is a functional block diagram, showing a further example of a servo drive control system for performing servo drive control of three units of voice coil motors incorporated in the image stabilizing device and system of FIG. 5.

FIG. 8 is a functional block diagram illustrating another alternative servo control system 90B for synchronized drive control of the second right and left gimbal frames 29R and 29L, of the gimbal device 20. This servo control system 90B is basically identical with the servo control system 90A shown in FIG. 7 except that a biaxial angular velocity detection device 69, which is capable of detecting vertical and horizontal components of vibrations, is substituted for the angular velocity detection devices 68, 68R and 68L, The biaxial angular velocity detection device 69 may be installed on either one of the right and left voice coil motors 40R and 40L. Specifically, in FIG. 8, the biaxial angular velocity detection device 69 is installed on, for example, the left voice coil motor 40L in place of the angular velocity detection device 68L. In this case, the biaxial angular velocity detection device 69 is capable of detecting both the horizontal component of vibration of the external gimbal frame 28 as well as the vertical component of vibration of the left internal gimbal frame 29L.

The servo drive control system 90B is configured as a double feedback loop for position servo control and angular velocity servo control as well and performs the operation for providing a control signal of a target position of the external gimbal frame 28 based on position information from, the position detection, devices 44 and angular velocity Information from the biaxial angular velocity detection device 69. On the other hand, in the operation of a target position of the left internal gimbal frame 29L, the servo drive control system 90B provides a control signal of a target position based on position information from the position detection devices 44L and angular velocity information from the biaxial, angular velocity detection device 69. However, the angular velocity information involved with the left internal gimbal frame 29L is shared in the operation of a target position of the right internal gimbal frame 29R.

As is the case with the servo drive control systems 90 and 90A shown in FIGS. 6 and 7, respectively, the servo drive control system 90B also is also configured as a double feedback loop for position servo control and angular velocity servo control, and enables synchronized drive control of the second right and left gimbal frames 29R and 29L of the gimbal device 20 as well.

This servo drive control system 90B is effective in reducing the cost of the image stabilizing device 200 resulting from the use of a single angular velocity detection device, namely the biaxial angular velocity detection device 69, in the servo drive control system 90B as a substitute for three angular velocity detection devices 68, 68R and 68L, in the servo drive control system 90A.

It is to be understood that although the present invention, has been described with regard to preferred embodiment thereof, various other embodiments and variants may occur to those skilled in the art, which are within the scope and spirit of the invention, and such other embodiments and variants are intended to be covered by the following claims.

What is claimed is:

1. An image stabilizing device for a binocular telescope having a pair of telescopic optical systems which are installed in parallel in a binocular housing and each of which is made up of an objective lens, an erecting prism and an eyepiece lens coaxially arranged in this order, each said erecting prism being capable of rotating on horizontal first and vertical second axes of rotation which intersect at right angles in a plane perpendicular to an optical axis of said telescopic optical system so as thereby to compensate for deteriorations of a telescopic optical image caused due to external vibrations, said image stabilizing device comprising:
   gimbal structure for mounting thereon both of said erecting prisms, said gimbal structure comprising:
      a gimbal easing fixedly mounted in said binocular housing;
      an external gimbal frame rotatably mounted on said gimbal casing so as to rotate on said horizontal first axis of rotation; and
      a pair of internal gimbal frames rotatably for fixedly holding said erecting prisms separately thereon, said pair of internal gimbal frames being separately mounted for rotation on said external gimbal frame so that said internal gimbal frames rotate independently from each other on said vertical second axis axes of rotation respectively;
   an angular velocity detector for detecting an angular displacement of at least one of said internal gimbal frames;
   an external frame drive voice coil motor disposed between said gimbal casing and said external gimbal frame for rotating said external gimbal frame on said horizontal first axis of rotation; and
   an internal frame drive voice coil motor disposed between said external gimbal frame and each of said internal gimbal frames for rotating each of said internal gimbal frames on said vertical second axis of rotation;
   each of said external frame drive voice coil motor and said internal frame drive voice coil motors comprises a first yoke member having a permanent magnet mounted thereon and a second yoke member having a looped coil with an empty space therein and a position detection device disposed in said empty space of said looped coil for providing a position signal indicating a position of said looped coil relative to said permanent magnet.

2. The image stabilizing device of claim 1, wherein each of said voice coil motors is at least partially mounted on said external gimbal frame.

3. The image stabilizing device of claim 2, wherein said second yoke member of each of said voice coil motors is mounted on said external gimbal frame.

4. The image stabilizing device of claim 2, wherein said second yoke member of each of said internal frame drive voice coil motors is at least partially embedded in said external gimbal frame.

5. The image stabilizing device of claim 1, wherein said angular velocity detector detects vertical and horizontal components of angular velocity of vibrations of either one of said pair of internal gimbal frames.

6. The image stabilizing device of claim 5, wherein said angular velocity detector comprises a biaxial angular velocity detection sensor disposed between said external gimbal frame and either one of said pair of internal gimbal frames.

7. The image stabilizing device of claim 5, wherein said angular velocity detector comprises an angular velocity detection sensor disposed between said gimbal casing and said external gimbal frame for detecting a horizontal component of angular displacements of said external gimbal frame and an angular velocity detection sensor disposed between said external gimbal frame and either one of said pair of internal gimbal frames for detecting a vertical component of angular displacement of one of said pair of internal gimbal frames.

8. The image stabilizing device of claim 1, further comprising a drive controller controls the operation of a drive control of each said voice coil motors in response to position information provided by said position detection device associated with each of said voice coil motors and angular displacement information provided by said angular velocity detector related to at least one of said pair of internal gimbal frames.

9. The image stabilization system of claim 1, further comprising a controller board affixed to said external gimbal frame, said controller board including a processor for operatively driving said first, second and third voice coil motors in response to signals from said at least one angular velocity detector.

10. The image stabilization system of claim 9, wherein said second yoke member of each of said first, second and third voice cod motors is at least partially embedded in said external gimbal frame.

11. An image stabilization system for a binocular imaging instrument comprising:
left and right optical paths extending between left and right objectives and corresponding left and right eyepiece lenses respectively;
left and right erecting prisms pivotally retained for independent vertical rotation within said left and right optical paths on left and right internal gimbal frames rotatable independently from each other, respectively;
an external gimbal frame supporting said left and right internal gimbal frames, said external gimbal frame being pivotally retained for horizontal rotation within a gimbal casing disposed within a housing of the instrument;
at least one angular velocity detector for detecting an angular displacement of at least one of said left and right internal gimbal frames; and
first, second, and third voice coil motors rotationally controlling said left and right internal, and external gimbal frames respectively in response to said angular velocity detector, each of said first, second, and third voice coil motors including a looped coil mounted on said external gimbal frame.

12. The image stabilization system of claim 11, wherein said left and right erecting prisms comprise Schmidt prisms.

13. The image stabilization system of claim 11, wherein said at least one angular velocity detector comprises a biaxial velocity detection device.

14. The image stabilization system of claim 11 wherein said first, second, and third voice coil motors comprise split-yoke type voice coil motors.

15. The image stabilization system of claim 11, wherein said first and second voice coil motors are at least partially disposed within said left and right internal gimbal frames, respectively.

16. The image stabilization system of claim 11, wherein said first and second voice coil motors are at least partially disposed within said external gimbal frame.

17. The image stabilization system of claim 11, wherein said third voice coil motor is at least partially disposed within said external gimbal frame.

18. The image stabilization system of claim 11, wherein said third voice coil motor is at least partially disposed within said gimbal casing.

19. The image stabilization system of claim 11, wherein each of said first, second, and third voice coil motors further comprises a controller board affixed to said external gimbal frame, said controller board being provided with said looped coil thereon and a processor operatively driving said first, second, and third voice coil motors in response to signals from said at least one angular velocity detector.

* * * * *